Nov. 13, 1934.  G. D. BRADSHAW  1,980,374

VALVE

Filed May 2, 1932  2 Sheets-Sheet 1

INVENTOR:
Grant D. Bradshaw

By E. J. Andrews

Att'y

Nov. 13, 1934.  G. D. BRADSHAW  1,980,374

VALVE

Filed May 2, 1932  2 Sheets-Sheet 2

INVENTOR:
Grant D. Bradshaw
By E. J. Andrews
Atty.

Patented Nov. 13, 1934

1,980,374

UNITED STATES PATENT OFFICE 1,980,374

VALVE

Grant D. Bradshaw, Beaver, Pa., assignor to Bradshaw & Company, Pittsburgh, Pa., a corporation of Pennsylvania Application May 2, 1932, Serial No. 608,624

8 Claims. (Cl. 103—40)

This invention relates to valves, and it has for its object providing automatic means for operating large valves so as to close the valve suitably and at proper times and without injury to the valve or other elements. The invention is particularly applicable to large check valves used in pipes which are transmitting liquids by means of centrifugal pumps. In such a case, it often happens that, if the pump is stopped, the liquid will reverse its direction of flow and may force the pump to run backward, often causing injury and also draining the liquid from the system.

Figure 1:
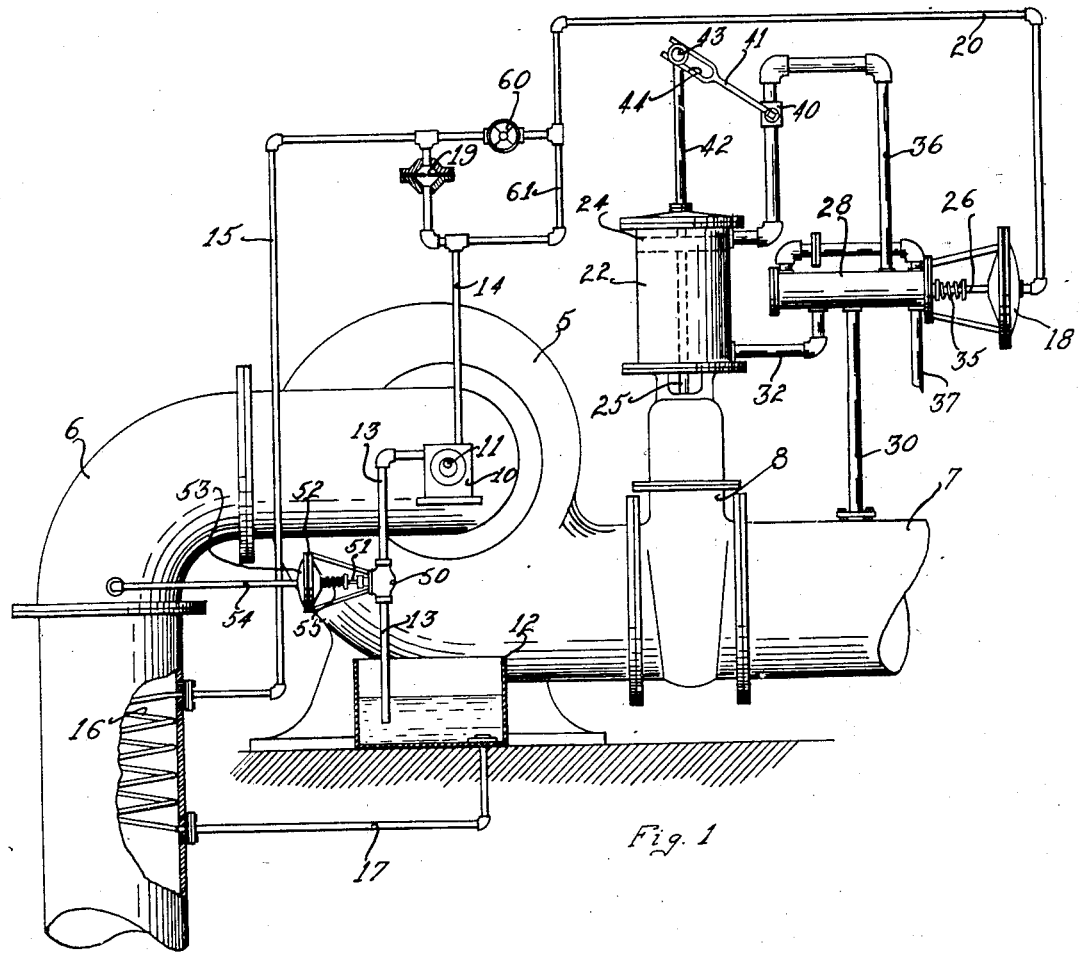
Figure 2:
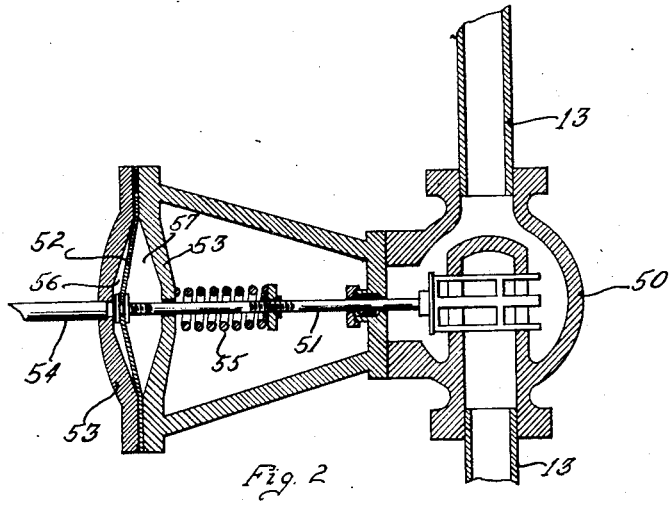
Figure 3:
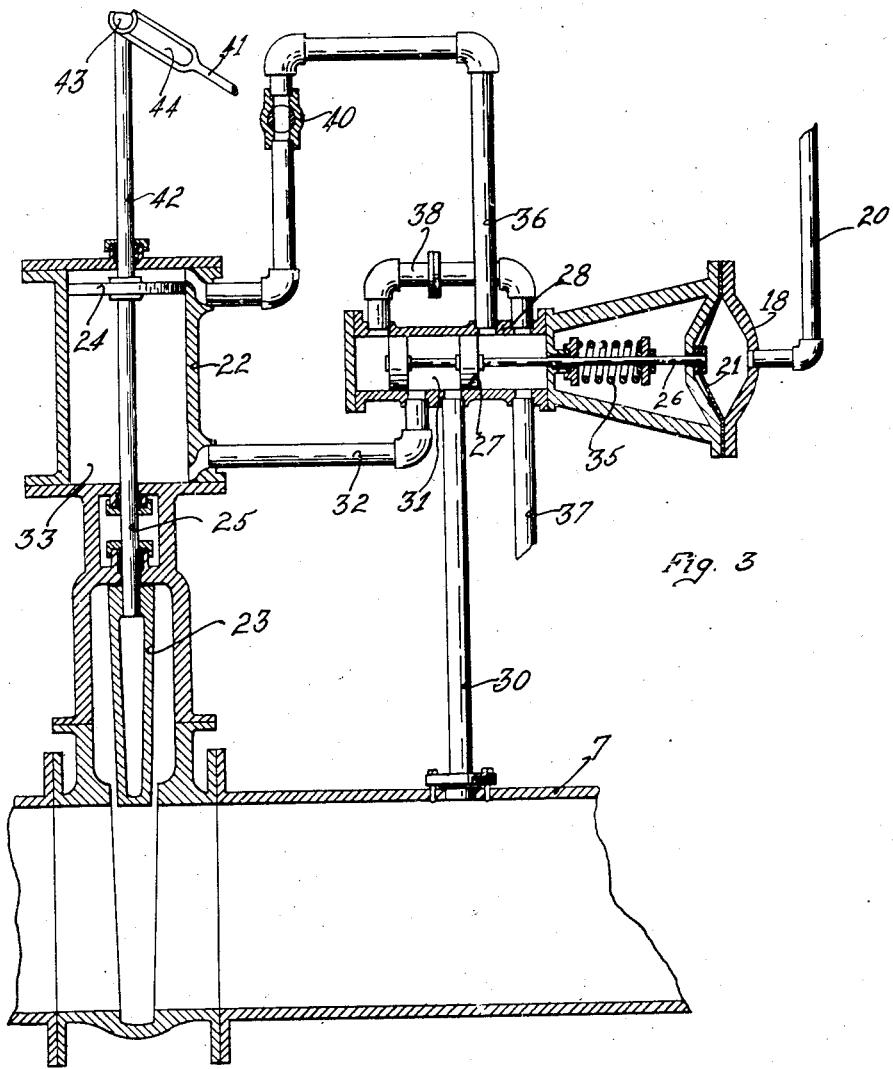
Figure 4:
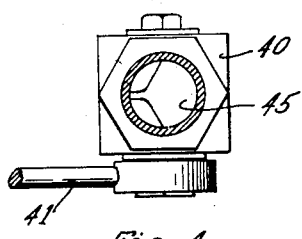

The objection to the ordinary swinging check valve, when used for such a purpose, is that it does not close until after the flow of water from the pump has actually reversed. When this occurs, the check swings shut with a heavy water hammer, which may cause serious injury. To prevent this, it is desirable to install a valve which will start to close before the flow in the line has reversed, and will be completely closed at about the point of reversal of flow. Also, it is desirable to have the valve close very rapidly at first, and then to close down more gradually until the final closing. If it should happen that the pump is not properly primed when it is started, the valve should be maintained closed until the pump is properly primed. Also, in case the suction of the pump is broken and the pump ceases to pump water even though it rotates at full speed, the valve should then be closed until the pump is operating properly. These objects I accomplish by my invention:

Of the accompanying drawings, Fig. 1 is an elevation of a pump system in combination with automatic means for operating the check valve, which embody the principles of my invention; Fig. 2 is an enlarged sectional view of one of the operating valves of the system and the operating means therefor; Fig. 3 is an enlarged sectional view of the main valve of the system and a portion of the operating means therefor; and Fig. 4 is an enlarged sectional view of another of the operating valves of the system.

Although my invention is applicable to various types of valves and for various purposes, and to the pumping of various liquids, yet, for simplicity, I have shown the system as applicable to a gate valve, and will describe it as applicable to the pumping of water in large pipes, such as is often the case in municipalities for supplying water for various purposes.

The water is pumped by means of any suitable type of pump, for example the centrifugal pump 5, from any source, through a pipe 6, and is discharged where desired through a pipe 7. Mounted in this pipe is any suitable valve, such as the gate valve 8. In such a system, it often happens that, for some reason, the pump is shut down intentionally or inadvertently, and it becomes desirable to close the valve, and the means which I have provided accomplishes this automatically and can be arranged or adjusted to do so according to the particular requirements of the system, in order to produce the best results, or as may be desired by the operator for any particular purpose.

The automatic means which I provide comprises a valve control pump 10, which is operated in any suitable manner so as to start and stop substantially synchronously with the main pump 5. I prefer to have this controlling pump directly connected to the shaft 11 of the main pump 5; but it is to be understood that this is not a necessary part of my invention. When so connected, and the main pump is for any reason stopped, the operation of the control pump will cease. This control pump is arranged to pump a liquid, preferably oil, from any suitable source, such as the tank 12, through a pipe 13, and into a pipe 14. This pump is positive in its action, so that at constant speed the pressure of the oil in the pipe 14 will be maintained at all times substantially constant. However, to increase the magnitude of the pressure, I prefer to force the oil through an orifice 19 mounted in the pipe 14, and the oil is then forced through pipes 15, 16 and 17, back into the tank 12. By this arrangement, the oil is continuously circulated through this system and, in order to prevent overheating of the oil, it is preferably passed through the cooling coils 16 which are mounted in the pipe 6. The water in the pipe 6 thus continually cools these coils and, hence, the contained oil.

With this oil circulating arrangement, a substantially continuous and uniform pressure is provided in the pipe 14. The pressure thus produced may be used to control the check valve. To accomplish this, a diaphragm casing 18 is connected by means of a pipe 20 with the pipe 14. As a consequence, the pressure in the pipe 14 will be at all times transmitted to the diaphragm 21 in the casing 18. This diaphragm is used to control the flow of pressure fluid, preferably water, into a cylinder 22 which is adapted to operate the gate 23 of the valve, by means of a piston 24 mounted in the cylinder and a stem 25 connecting the piston with the valve.

The diaphragm 21 is connected, by means of a stem 26, to a pair of pistons 27 mounted in a casing 28. When the system is put in operation, the oil pressure forces the diaphragm inwardly, carrying with it the pistons 27, so that water under pressure is free to flow from the discharge pipe 7 into the pipe 30 through the chamber 31 and the pipe 32, into the chamber 33 of the cylinder 22, thus forcing the piston 24 and the gate 23 upwardly and holding the valve open. In this manner, the opening of the valve is at all times insured so long as the system is in proper operation.

If, however, the main pump 5 is stopped, the control pump 10 will also stop, and the pressure in the pipe 14 will reduce. If properly arranged, the result will be that the pressure in the diaphragm chamber will reduce to such a point that the spring 35 will force the pistons 27 outwardly, closing communication between the pipes 30 and 32 and opening communication between the pipes 30 and 36, so that the water pressure is operative through the pipe 36 in the upper end of the cylinder 22, and the piston 24, together with the gate 23, will be forced downwardly.

It will be understood that the discharge from the cylinder 22 is cared for in an ordinary manner by means of the pistons in the casing 28. When the pistons are forced inwardly, the discharge in the upper end of the cylinder 22 is free to pass through the pipe 36 and the pipe 37 to any point desired, such as the sewer. On the other hand, when the pistons are in the outward positions, the discharge is free to pass through the pipe 32 and the pipe 38 to the pipe 37.

In this manner, it will be seen that, as soon as the main pump 5 begins to slow down, the control pump will be operated accordingly; and, by proper adjustments of the spring 35, the pressure of the oil will reduce sufficiently at the proper time to allow the pistons 27 to be moved outwardly, so as to close the valve before the direction of flow of the water is reversed. In ordinary practice, it is desirable to close the valve before the main pump comes to rest, as the back pressure of the water is likely to reverse the flow while the pump is slowing down to rest.

However, it is desirable to vary the rate of closing of the valve according to conditions. With the apparatus hereinabove described, as soon as the water pressure was transferred above the piston 24, the valve would be quickly forced entirely closed. This might be objectionable in many cases. The valve might be closed too soon and so quickly as to cause injury. Hence, I prefer to provide means for controlling the rate of closing of the valve.

These means comprise the valve 40 mounted in the pipe 36, which is preferably an ordinary rotating valve. Fixed to this valve is an arm 41, which is operatively associated with a stem 42 connected to the piston 24. This connection may be provided for by means of a pin 43 operating in a slot 44 in the arm 41. In the normal operating position of the piston, the arm 41 will be elevated, as indicated, and the valve 40 will be wide open. But, as the piston 24 is forced downwardly by the stopping of the pumps, it will carry with it the arm 41, thus closing the valve 40. As a consequence, the flow of water to the upper end of the piston may be suitably retarded so that the movement of the valve will be retarded accordingly; and, if the elements are properly adjusted, the movement of the valve will be very slow, just as it closes.

The port of the ordinary type of rotating valve does not give the best control of the movement of the valve gate, as it is desirable to have the gate move very rapidly during the first two-thirds of the stroke and, then, to slow down materially until the valve is finally closed. To accomplish this, I prefer to provide a valve port 45 for the valve 40, somewhat as is shown in Fig. 4. With this form of port, the flow of water to the upper end of the cylinder 22 is not materially interfered with until the piston is substantially two-thirds of the way down. From that point on, the port of the valve 40 closes very rapidly and, thus, the gate of the valve 8 is moving very slowly just as it closes. The valve 40, however, is not entirely closed, as this would prevent the discharge of water from the upper end of the cylinder 22 when the main pump is again put in operation.

When the pump is again started up, the pressure in the oil lines will rise and the diaphragm 21 and the pistons 27 will be forced inwardly, allowing the water pressure to pass into the lower end of the cylinder 22, thus forcing the piston 24 upwardly and opening the valve. The opening of the main valve, however, in the beginning is also gradual, owing to the throttling of the water discharge from the upper end of the cylinder, by means of the valve 40. But, as the valve 40 opens, the movement of the valve gate 23 will be accelerated until it is entirely open.

If it should happen that the main pump is not properly primed when it is started or should become unprimed when in operation, there will be no suction in the inlet pipe 6 by the action of the main pump, and the pressure in this pipe adjacent the pump will be substantially atmospheric pressure. In such a case, it is desirable to maintain the gate valve closed, or to close the valve if it is open, until the proper operation of the pump is arranged for.

To prevent the oil system from opening the valve when the unprimed pump is operating, I prefer to provide a valve 50 in the exhaust pipe 13 of the oil circulating system. The valve stem 51 of this valve is connected to a diaphragm 52 in the diaphragm casing 53. The diaphragm chamber of the casing 53 is connected, by means of a pipe 54, to the inlet side of the main pump or to the pipe 6. A spring 55 tends to force inwardly the stem 51 and thus to close the valve 50.

In normal operation, the pressure in the inlet pipe 6 is reduced by suction materially below the atmospheric pressure. This will cause a corresponding reduced pressure in the chamber 56, and the air pressure acting in the chamber 57 will force the diaphragm and stem 51 to the left, thus forcing the valve open. But, when the main pump is operating and unprimed, the atmospheric pressure in the pipe 6 and the chamber 56 will permit the spring 55 to force the diaphragm 52 and the stem 51 to the right, and thus to close the valve 50.

As a consequence of the closing of the valve 50, the pressure in the pipes 14 and 20 will reduce sufficiently to allow the spring 35 to hold the pistons 27 outwardly and, thus, to allow the piston 24 to hold the valve gate in its closed position. As soon as the pump is properly primed, however, the pressure in the inlet pipe 6 will be reduced by suction to such a point as to allow the valve 50 to open, and this will allow oil pressure effective on the diaphragm 21 to increase sufficiently, so as to cause the pistons 27 to be forced inwardly and, thus, to open the gate valve.

Also, if in any way the pump while in operation should become unprimed, this mechanism will operate to close the main valve. In such a case, the increase in pressure in the pipe 6 will permit the spring 55 to force the valve 50 closed and to hold it closed. This will decrease the pressure on the diaphragm 21 sufficiently to cause the main valve 8 to be closed until the pump is again properly operating.

I prefer also to provide in the system a valve 60, which may be operated in any desired manner so as to close the main valve 8. Opening valve 60 will by-pass the orifice 15, by allowing the oil to short-circuit the orifice 19 by circulating through the pipe 61. This will reduce the oil pressure on the diaphragm 21 and, thus, will maintain the main valve in its closed position, or close it if open, without reference to the operation of either pump.

It will thus be seen that I have provided means for automatically controlling the closing of the main valve, according to the operation of the main pump, so that the valve is opened or closed as may be desired for the best operation of the system, and means are provided allowing for various adjustments, so that the reciprocal operation of the valve and the pump may be provided for so as to produce any particular results that may be desired. At the same time, injury or undesirable operation of the system is prevented in case of any accident or any inadvertent or careless operation thereof.

Although I have illustrated and described the oil circulating system as depending upon a pump connected directly to the shaft of the main pump, yet it will be understood that the operation of the oil pump might be arranged for otherwise. In case of an electrically driven main pump for instance, similar results might be obtained by driving the oil pump by a motor, the current of which would depend upon the flow of the current to the main motor, so that, when the main motor was stopped, the oil pump would stop automatically, as is the case with the system described.

Also any liquid could be used in the circulating system, such as water. For instance, the circulating pump 10 could be arranged to pump water from the sump or source of supply of the main pumping system and discharge it back into the same source. In such a case, no means would be required to cool the circulating liquid.

I claim as my invention:

1. In a pumping system, a main pump having an inlet pipe and an outlet pipe, a valve in the outlet pipe, a valve control pump operated by the main pump, a hydraulic motor mechanically connected with said valve, and also in fluid connection with said outlet pipe, a hydraulic motor in fluid connection with said control pump, said latter motor being arranged to control the flow of fluid from said outlet pipe to said first-mentioned motor.

2. In a pumping system as claimed in claim 1, said control pump having an inlet pipe, a valve in said pipe, and a fluid motor mechanically connected with the latter valve and in fluid connection with the inlet pipe of the main pump.

3. In a pumping system, a main pump having an inlet pipe and an outlet pipe, a valve in said outlet pipe, and hydraulic means for operating said valve, said means comprising a control fluid pressure pump operated by the main pump and having an inlet pipe, a valve in the latter inlet pipe, and a fluid motor for operating the inlet pipe valve, said motor comprising a diaphragm chamber, and a diaphragm in said chamber operatively connected with said inlet pipe valve, said chamber being in communication with the inlet pipe of said main pump.

4. In a pumping system having a conduit, means for forcing a fluid through said conduit, means for closing the conduit, and means for operating said closing means, said latter means comprising a pump operated by said fluid forcing means, a hydraulic motor mechanically associated with the closing means, means for passing pressure fluid from said conduit to said motor, and means associated with said pump for controlling the flow of said fluid to said motor so as to operate the closing means, the operation of said last mentioned means being responsive to the operation of said fluid forcing means.

5. In a pumping system, a main pump having an inlet pipe and an outlet pipe, a valve in the outlet pipe, a valve control pump operatively associated with the valve and arranged to operate substantially synchronously with the main pump, a circulating system operated by said control pump for controlling said valve, said circulating system having a valve adjacent the inlet of said control pump, and a fluid motor for opening and closing said latter valve, the motor being responsive to variations in fluid pressure and being operatively connected to the inlet of the main pump.

6. In a pumping system, a main pump having an inlet pipe and an outlet pipe, a valve in the outlet pipe, and a valve control pump operatively associated with the valve and arranged to operate with the main pump and being responsive to the fluid pressure in the inlet of the main pump.

7. In a pumping system, a pump having an inlet and an outlet, a supply pipe connected to the inlet and a delivery pipe connected to the outlet, a valve in the latter pipe, means operable by the fluid pressure in the outlet pipe beyond the valve for opening the valve, and means controlled by the pump for operatively connecting said last mentioned means with the outlet pipe.

8. In a pumping system as claimed in claim 7, said pump controlled means being responsive to the fluid pressure in the inlet pipe for closing the valve.

GRANT D. BRADSHAW.